United States Patent [15] 3,700,731
Sullivan [45] Oct. 24, 1972

[54] PROCESS FOR OXIDIZING XYLENES TO PHTHALIC ACIDS

[72] Inventor: Robert H. Sullivan, Woodbury, N.J.

[73] Assignee: E. I. du Pont de Nemours and Company, Wilmington, Del.

[22] Filed: Feb. 28, 1969

[21] Appl. No.: 803,441

Related U.S. Application Data

[63] Continuation-in-part of Ser. Nos. 667,646, Sept. 14, 1967, abandoned, and Ser. No. 742,150, July 3, 1968, abandoned.

[52] U.S. Cl. ............................................260/524 R
[51] Int. Cl. ...............................................C07c 63/02
[58] Field of Search ..................................260/524 R

[56] References Cited

UNITED STATES PATENTS 2,962,361   11/1960   Spiller et al. ............... 260/524
2,245,528   6/1941   Loder ......................... 260/524
2,746,990   5/1956   Fortuin et al. ............. 260/524
2,833,817   5/1958   Saffer ......................... 260/524

Primary Examiner—Lorraine A. Weinberger
Assistant Examiner—R. S. Weissberg
Attorney—James R. Morrison

[57] ABSTRACT

Continuous process for the oxidation of xylenes with oxygen at about 105° to 150° C wherein xylene is added at the same rate as phthalic acid is formed and xylene and partially oxidized intermediates, including those entrained in the phthalic acid are recycled continuously, a critical hold-up time is exceeded and the reaction mixture contains at least about 0.1 mole percent xylene based on the total of xylene and its oxidation products.

10 Claims, 1 Drawing Figure

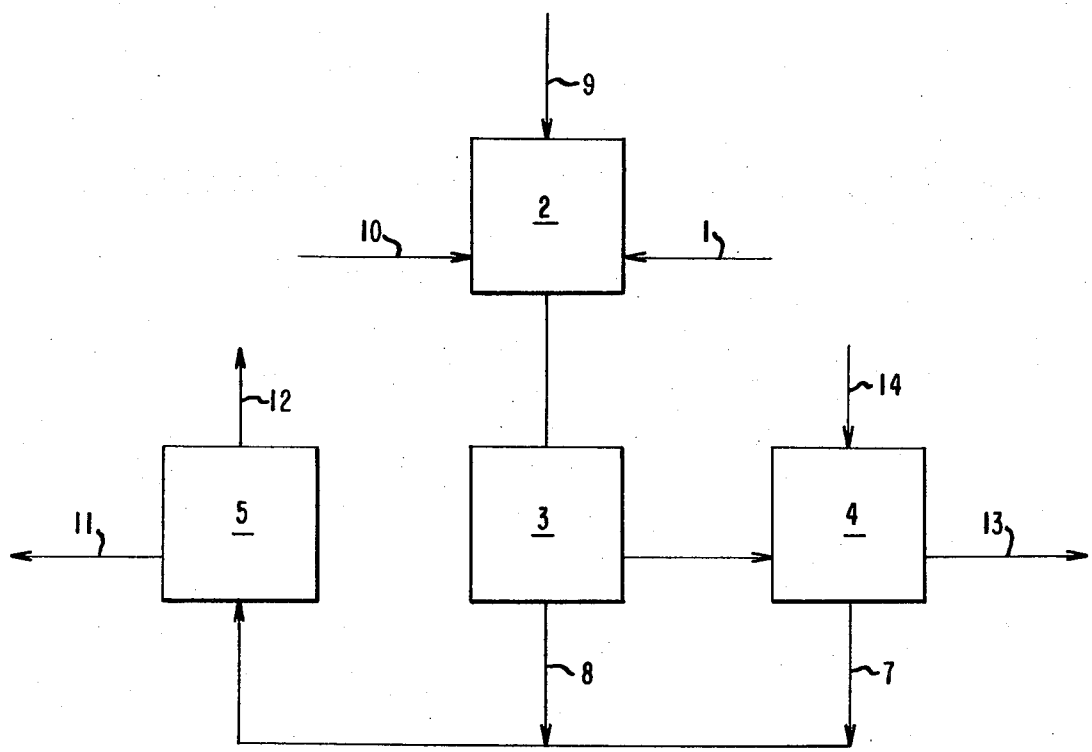

PROCESS FOR OXIDIZING XYLENES TO PHTHALIC ACIDS

CROSS-REFERENCE TO PRIOR APPLICATIONS

This application is a continuation-in-part of my prior copending application Ser. No. 667,646, filed Sept. 14, 1967 and my prior copending application Ser. No. 742,150, filed July 3, 1968, both now abandoned.

BACKGROUND OF THE INVENTION

1. Field of Invention

This invention relates to the oxidation of alkyl side chains of substituted aromatic compounds.

2. Description of the Prior Art

Many methods have been disclosed for the oxidation of xylenes and their intermediate oxidation products with molecular oxygen, particularly the air oxidation of p-xylene, p-tolualdehyde, or p-toluic acid to terephthalic acid. However, all of these methods have certain serious disadvantages. For example, the oxidation of p-xylene, alone, directly by an oxygen-containing gas in the presence of a metal catalyst produces, almost exclusively, p-toluic acid, which then must be esterified in order to oxidize effectively the remaining methyl group. Phthalic acids have been made by oxidizing p-xylene in solution in an aliphatic acid which also contains a bromide promoter and a metal catalyst (U.S. Pat. No. 2,833,816). Although this method does give phthalic acid in one step, it is not entirely suitable because the bromide increases the corrosivity of the oxidation medium. Another method for making phthalic acids involves adding a ketone promoter, such as methyl ethyl ketone, to an oxidation system containing p-xylene, an aliphatic acid and a metal catalyst (U.S. Pat. No. 3,036,122). This process involves making, as a co-product, a large quantity of acetic acid which must be sold in order for the process to be economically attractive.

U.S. Pat. No. 2,723,994 discloses the unpromoted oxidation of a mixture of xylene and toluic acid by oxygen wherein the ratio of acid to xylene is maintained below 75:25 but above 50:50; however, the yields and conversions taught are relatively low and the conditions unsuitable for continuous operation.

SUMMARY OF THE INVENTION

This invention provides an improved process for oxidizing xylenes to phthalic acids which gives high yields and space-time yields and does not require a promoter. More specifically, there is provided in accordance with this invention an improvement in the process for oxidizing xylenes, particularly p-xylene, to the corresponding phthalic acids, in solution in the presence of heavy metal oxidation catalyst. The improvement of this invention comprises carrying out the oxidation reaction at a temperature of about from 105° to 150°C, continuously feeding xylene, preferably p-xylene, to the reaction mixture at about the same rate phthalic acid is formed and continuously recycling xylene plus oxidation intermediates soluble in the system at the reaction conditions including those obtained on gross separation of the phthalic acid from the reaction mixture as well as such intermediates entrained in the solid phthalic acid formed in the reaction. The minimum hold-up time (as defined hereinafter) of the reaction mixture is equal to the sum of the reciprocals of the first order rate constants for the oxidation reactions in the system and the xylene concentration is at least about 0.1 mole percent of the total of xylene and oxidation products thereof, that is, tolualdehyde, toluic acid, formylbenzoic acid, and phthalic acid.

DETAILS OF THE INVENTION

One preferred embodiment of this invention is schematically illustrated in the accompanying drawing.

In the drawing 2 represents a reactor fitted with an agitator. The feed 1 is a mixture containing xylene, acetic acid, tolualdehyde, cobalt (as a soluble cobalt compound), toluic acid and formylbenzoic acid. Air is fed in at 9. The reaction mixture is withdrawn continuously (i.e., steadily) or in frequent intervals during the reaction and sent to a filter 3 where the terephthalic acid is filtered off. The filtrate 8 is distilled at 5 to remove water of reaction 11 and some acetic acid. The terephthalic acid is sent to a digester 4 where it is digested with acetic acid fed at 14, and filtered. The filtrate 7 is combined with filtrate 8 and distilled at 5, the remaining solution 12 of p-xylene and oxidized derivatives thereof being recycled to reactor 2. The terephthalic acid 13 can be sent to subsequent purification steps. Fresh xylene is fed in at 10 to replace that converted by oxidation.

The process of this invention is particularly adapted to the oxidation of p-xylene to terephthalic acid although it is useful for other xylenes, e.g., m-xylene to isophthalic acid, or to mixtures of xylenes to mixed phthalic acids. Unless otherwise indicated phthalic acid is used herein to refer generally to all the isomers of benzene dicarboxylic acid.

The heavy metal catalyst can be any of those conventionally used in the oxidation of xylenes with molecular oxygen, including those of the heavy metals shown on page 56 and 57 of Lange's "Handbook of Chemistry", 8th Edition, 1952. Preferably, the catalyst comprises a heavy metal having an atomic number of 25–28 inclusive, and most preferably cobalt or manganese. Mixtures of heavy metals can be employed also. The heavy metal can be introduced into the system in any form, the only requirement being that it be soluble in the system or react with some component of the system to become soluble. Thus, the heavy metal can be in the form of metal, oxide, or salt such as acetate, nitrate or naphthenate. However the heavy metal catalyst is introduced be it soluble per se or react to yield a compound which is soluble, the ultimate form of the catalyst should be soluble at least to the extent necessary to provide the desired quantity of active heavy metal, usually at least about 0.1 percent (calculated as metal) based on the weight of the reaction mixture, and preferably about from 0.2 to 5 percent.

The solvents used in accordance with this invention also can be those conventionally used in the oxidation of xylenes with molecular oxygen. Of these, 2 to 6 carbon aliphatic monocarboxylic acids such as acetic, propionic, butyric, valeric and caproic acids, as well as mixtures of such solvents are usually used. Because of its low cost and its good solvent properties acetic acid is particularly preferred. Usually, the weight ratio of solvent to xylene and its oxidized derivatives, calculated as equivalent xylene (one mole of oxidized product equals one mole of xylene), is about from 1:1 to 12:1, a ratio of about 1.5:1 to 3:1 being particularly preferred. If too much solvent is present, the rate of oxidation is lowered, while if too little solvent is used the reaction mixture becomes difficult to agitate and contact with oxygen.

The reaction temperature is about from 105° to 150°C and preferably 115° to 140°C. Below about 105°C the oxidation rate is markedly slowed. Substantially above 140°C solvent, e.g., acetic acid, and xylene are degraded as evidenced by evolution of $CO_2$. Also, at high temperature, side reactions occur, such as thermal decomposition of hydroperoxide, which give by-products, such as phenols, which are not only undesired, but poison the oxidation.

Fresh xylene is added at a rate substantially equal to the rate of formation of phthalic acid. The recognition of the series of intermediates through which xylene passes and necessity of their recycle with the xylene feed is an important aspect of this invention. This series is considered herein as:

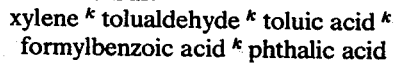

wherein the k's are the first order rate constants for the reactions involved. Although the reaction sequence just noted is simplified and other intermediates are present along the reaction path in lesser amounts or in less stable configurations, the course of reaction can be defined by determining the concentrations of the five noted materials and determining reaction rate parameters from such concentrations.

It has been found that mere separation of the solid phthalic acid formed during the reaction from the reaction mixture, e.g., by filtration, does not separate a large proportion of critical intermediates, particularly toluic acid and formylbenzoic acid, which are entrained with the crystals of the phthalic acid. Therefore, special steps must be taken to recover such entrained intermediates. Preferably, at least 50 percent by weight and usually at least 90 percent of such entrained intermediates are recovered and recycled, preferably in a digestion step or by dissolution and recrystallization described below. Unless such entrained intermediates are recycled to the reaction mixture, the unique results obtained in accordance with this invention are not obtained.

Another critical aspect of this invention is that the hold time in the reactor be at least equal to the sum of reciprocals of the first order reaction rate constants under the conditions of reaction. As a rough approximation, minimum hold time can be estimated as $1.16/k_3$ wherein "$k_3$" is the first order reaction rate constant for the reaction of toluic acid to formylbenzoic acid under the reaction conditions. The hold time in any particular case also is equal to the moles of xylene and its oxidation products in the reactor divided by the moles of fresh xylene fed per minute. Generally, hold time decreases with an increased oxygen partial pressure and catalyst concentration. For the preferred ranges of catalyst concentration and oxygen partial pressure, the minimum hold time is on the order of 115 minutes or higher, e.g., 140 minutes, depending on the aforementioned reaction conditions.

The reaction mixture also contains at least about 0.1 mole percent xylene, and preferably at least 1 mole percent, based on xylene and oxidation products thereof. In effect, this specifies a maximum hold time for any particular feed rate. The process of this invention can be carried out in two or more stages in series with recycle between each stage, or alternatively with recycle across the whole series of stages. In such case, the conditions set forth herein, particularly as to hold time minimums apply to the average conditions, i.e., the conditions across the series of stages. Preferably, however, the process of this invention is carried out in a single stage reactor with conventional means for vigorous agitation.

The process of this invention can be carried out with pure oxygen, air, oxygen-enriched air, or other mixtures of oxygen with inert gases such as $CO_2$, nitrogen, argon, etc. Air and air enriched with up to about 50 percent of oxygen are particularly preferred because of rapidity of oxidation and low cost. The partial pressure of oxygen is usually about 1.5 to 45 psi, and preferably, for optimum speed of reaction and economics, 4.5 to 30 psi, based on non-condensibles. Conveniently, such partial pressure can be measured by correlation with total reactor pressure and oxygen content of the exit gas (less condensibles), e.g., at 150 psia, 1.5 and 4.5 psi correspond to 1 and 3 percent oxygen, respectively, in the exit gas and at 300 psia, 30 and 45 psi correspond to 10 and 15 percent oxygen, respectively. Normally, the oxygen feed corresponds to about 1.5 to 500, and preferably 1.5 to 75 moles of oxygen per mole of methyl groups being oxidized. Of course, total pressure varies with the particular system, and especially with the partial pressure of the solvent; the principal requirement for total pressure is that the pressure be sufficient to keep all reactants in the liquid phase. Normally, such pressures vary from atmospheric to 200 atmospheres and, usually, atmospheric to 50 atmospheres.

Water is normally distilled from the liquid components of the reaction mixture during recycle (at 5 in the drawing), preferably in an amount sufficient to hold the water content in the reaction mixture at less than 15 percent, and preferably less than 5 percent of the total reaction mixture. Water of reaction also can be removed by flashing part of the liquid in the reaction product.

Under the preferred oxygen partial pressures set forth above and under the other reaction conditions described herein, the weight ratios of xylene to intermediate oxidation products in the continuous reaction mixture is about as follows:

| Xylene to | Wt. Ratio |
| --- | --- |
| tolualdehyde | 1/1–5/1, e.g., 2/1–5/1 |
| toluic acid | 1/15–1/40, e.g., 1/15–1/30 |
| formylbenzoic acid | 0.25/1–2/1, e.g., 0.4/1–2/1 |

The slurry reaction mixture can be removed from the oxidation reactor intermittently, preferably at intervals of 1 minute or less. Preferably, however, particularly in large scale operations, it is removed continuously. Preferably, the concentration of phthalic acid does not exceed 50 mole percent of the xylene and oxidized products in the reaction mixture, and usually is in the range of 15 to 30 percent.

Oxidation intermediates entrained in the crystals of phthalic acid in the reaction mixture slurry can be removed by digestion at elevated temperature, e.g., 200° to 300°C, preferably for about from 1 to 30 minutes. Preferably, there is a staged separation of oxidation intermediates for recycle to the reactor. Thus, preferably, the bulk of the liquids in the reaction mixture are separated from the phthalic acid crystals, e.g., by filtration or centrifuging, optionally with a wash with the solvent used for the reaction mixture, then digested at elevated temperature in a suitable solvent, e.g., 200° to 300°C, preferably for 1 to 30 minutes, the digestion time varying inversely with the temperature. The digested product is cooled, e.g., to 100°–150°C, to crystallize phthalic acid therefrom, the phthalic acid separated therefrom, e.g., by filtration or centrifuging, the filtrate containing entrained impurities being added to the filtrate from the first separation step. Solvents used in the digestion step are preferably those used in the reaction, especially acetic acid, the weight ratio of solvent to phthalic acid usually being about from 1:1 to 20:1, and preferably 2:1 to 10:1.

Instead of digesting the crude phthalic acid crystals after separating the bulk of the liquid therefrom, alternately the crude phthalic acid can be dissolved in the solvent for the reaction mixture, then recrystallized and filtered or centrifuged, the separated liquids containing intermediate oxidation products being recycled to the reaction mixture. Preferably, such dissolution is carried out in acetic acid or concentrated (80 wt % or more) aqueous solution thereof at temperatures on the order of 280° to 350°C and preferably about 300°C. The recrystallization can be carried out in a single crystallization vessel, e.g., at 150° to 200°C, or, alternately, the solution of crude phthalic acid can be passed through a plurality of, e.g., two or three crystallization vessels in series, the pressure and temperature being let down between each vessel, the recrystallized acid being removed and filtered or centrifuged from the product of the last of the staged crystallizers. The final crystallization temperature should, of course, be above that at which impurities, principally toluic acid, begin to coprecipitate in substantial quantities. Also, various washes can be interspersed between the aforementioned steps, e.g., an acetic acid or aqueous acetic acid wash of the crude acid prior to recrystallization and similar acidic and/or water washes thereafter. Filtrates or centrifugates containing significant quantities of intermediate oxidation products are recycled to the reaction medium.

As use dictates, the resulting semi-refined phthalic acid can be further purified, e.g., to fiber-grade quality, as described, for example, in British Pat. No. 994,769.

The liquid components obtained through the separation stages are preferably combined and distilled to remove water of reaction and excess solvent, xylene and the oxidation product intermediates thereof contained in the liquid being combined with fresh xylene feed and returned to the reactor.

In the following detailed working examples which illustrate this invention, parts and percentages are by weight unless otherwise indicated. All equipment is either glass lined or of stainless steel, except the digester which is glass or titanium lined.

EXAMPLE 1

An autoclave is charged about two-thirds full with a portion of a mixture comprising 1,000 parts of acetic acid, 450 parts of p-toluic acid, 150 parts of p-xylene, 92.5 parts of cobalt acetate tetrahydrate and 25 parts of water, pressurized to 300 psig with nitrogen and heated to 130°C. Vigorous agitation is started, then air is fed to the bottom of the autoclave. Initially, oxygen content monitored in the off gas falls to about 2 to 5 percent oxygen then rises and is maintained at about 5 to 7 percent oxygen. (Oxygen partial pressure about 15 to 20 psi based on non-condensibles). The temperature is maintained at 130°C by cooling. The above mixture is used as feed until recycle is obtained and accumulated in a hold tank as feed as described below, at which time the recycle plus fresh p-xylene gradually replace the start-up feed. At steady state conditions the fresh p-xylene and recycle are combined and continuously fed to the reactor, the fresh p-xylene being added at about the same rate terephthalic acid is formed. Gas and slurry product are withdrawn continuously from a side arm of the reactor. The gaseous effluent is vented through a water-cooled condenser while the slurry reaction mixture is collected at about 100°C in a hold-up tank for the two-stage separation of terephthalic acid from reaction intermediates.

Slurry is withdrawn from the hold tank and filtered at atmospheric pressure at about 100°C, the crude terephthalic acid being washed with a small proportion of acetic acid and sent to the subsequent purification while the filtrate including the wash acid is distilled at atmospheric pressure to remove water of reaction overhead and excess acetic acid as an intermediate cut. Unreacted xylene carried overhead with the water is separated from the water and returned to the reactor with the recycle feed.

The crude filter cake from the first stage separation, containing about 85% terephthalic acid, 10 percent p-toluic acid and 5 percent p-formylbenzoic acid (dry basis) is slurried with acetic acid in about a 2:1 weight ratio then digested at about 240°C for 10 minutes at autogenous pressure (500–520 psig). The digested product is filtered at about 100°C at atmospheric pressure, washed with acetic acid and air dried to constant weight at 100°C to yield semi-refined terephthalic acid of about 98–99 percent purity in a yield in excess of 95 percent based on p-xylene.

The filtrate and wash liquor from the second stage separation are combined and evaporated to dryness at a pressure of 26 inches of mercury to yield solid p-toluic acid, p-formylbenzoic acid, and associated intermediates which are incorporated in the recycle feed. Alternately, the filtrate can be combined directly with the filtrate from first stage separation, then the combination distilled to remove water and excess acetic acid and recycled.

The steady-rate continuous reaction conditions are:
Temp., °C, 130
Pressure, psig, 300
Hold-up time, 230 minutes
Minimum hold-up time under reaction conditions, 140 minutes $O_2$ Partial Pressure     23.5 psi
                                                     based on non-condensibles
Off Gas % $O_2/CO_2$     7.5/0.7

| Feed Composition, % | | Reaction Composition, % (100% basis) |
|---|---|---|
| Acetic Acid | 65 | 61.0 |
| p-Xylene | 7.4 | 0.7* |
| (Fresh) | (6.5) | |
| (from recycle) | (0.9) | |
| p-Toluic Acid | 23 | 19.8 |
| p-Formylbenzoic Acid | 0.3 | 1.8 |
| Terephthalic Acid | 0 | 10.4 |
| Cobalt acetate tetrahydrate (as Co.) | 1.3 | 1.2 |
| Water | 3.0 | 5.1 |

*about 3 mole % based on C8 components inclusive of terephthalic acid.

In a like manner isophthalic acid can be prepared by substituting an equal weight of m-xylene for the p-xylene in the above example.

EXAMPLE 2

Terephthalic acid is prepared from p-xylene by the general procedure described in Example 1 under the following conditions, i.e., Example 1 is repeated with the materials and under the conditions shown therein, except as set forth below.

REACTOR

| | |
|---|---|
| Temp., °C | 130 |
| Pressure: | |
| Total pressure, psig | 225 |
| O₂ partial pressure, psi | 23.5 |
| Hold time, min | 250 |
| Minimum hold time under Conditions, min | 140 |
| Air Feed Rate | 0.22 part/part total feed |
| Liquid feed rate, parts by wt | 28 parts/min |
| Feed Composition, % | |
| Acetic Acid | 70.5 |
| p-Xylene | 4.8 |
| p-Tolualdehyde | 0.3 |
| p-Toluic Acid | 18.9 |
| p-Formylbenzoic Acid | 1.0 |
| Terephthalic Acid | 0.4 |
| Cobalt acetate tetrahydrate (as Co.) | 0.92 |
| Water | 3.2 |
| Reactor Composition, % | |
| Acetic Acid | 67.7 |
| p-Xylene | 0.6 |
| p-Tolualdehyde | 0.3 |
| p-Toluic Acid | 17.4 |
| p-Formylbenzoic Acid | 1.2 |
| Terephthalic Acid | 7.6 |
| Cobalt | 0.89 |
| Water | 4.3 |
| Off Gas, % O₂/CO₂ | 9.8/0.8 |

DIGESTER

| | |
|---|---|
| Temperature, °C | 240 |
| Pressure, psig | 500–520 |
| Digestion time, min | 10 |
| Product Composition, % | |
| Terephthalic Acid | 98.9 |
| p-Toluic Acid | 0.4 |
| p-Formylbenzoic Acid | 0.7 |
| Overall yield, p-xylene to terephthalic acid | 95% |

At least equivalent results are obtained if, instead of being digested, the crude filter cake is washed with acetic acid, dissolved therein at about 300°C, recrystallized therefrom in three staged vessels in series at 240°, 200° and 160°C, then filtered and washed successfully in acetic acid and water. Each acetic acid wash filtrate is recycled to the reaction system.

The above procedure is repeated at a reaction temperature of 120°C, using oxygen at a partial pressure of 10 psi. Similar results are obtained except for a slightly lower space-time-yield.

I claim:

1. In the process for the manufacture of phthalic acids which comprises oxidizing xylenes in solution with molecular oxygen in the presence of heavy metal catalyst, the improvement which comprises maintaining the reaction mixture at a temperature of about from 105° to 150°C, continuously feeding xylene to the reaction mixture at about the same rate phthalic acid is formed, continuously recycling xylene and partially oxidized derivatives thereof, including at least 50 percent by weight of those entrained in the solid phthalic acid as it is formed, the minimum hold-up time in said reaction mixture being equal to the sum of the reciprocals of the first order rate constants of the oxidation reactions at the reaction conditions, the xylene concentration being at least about 0.1 mole percent of the total of xylene and oxidation products thereof.

2. A process of claim 1 wherein p-xylene is oxidized to terephthalic acid, solid terephthalic acid being separated from the liquid component of the reaction mixture, p-xylene and oxidized derivatives thereof so separated as well as such products entrained in said separate terephthalic acid being continuously recycled to said reaction mixture along with fresh p-xylene.

3. A process of claim 2 wherein a solution of p-xylene in acetic acid is oxidized in a single stage with molecular oxygen at a partial pressure of about from 1.5 to 45 psi in the presence of a cobalt catalyst.

4. A process of claim 3 wherein terephthalic acid separated from the reaction mixture is digested in acetic acid to remove entrained partial oxidation products which are recycled to the reaction mixture.

5. A process of claim 4 wherein said terephthalic acid separated from the reaction mixture is digested in about 1 to 20 times its weight of acetic acid at about from 200° to 300°C for about from 1 to 30 minutes to remove intermediates entrained therein.

6. A process of claim 3 wherein terephthalic acid separated from the reaction mixture is recrystallized from acetic acid or a concentrated aqueous solution thereof to remove entrained partial oxidation products which are recycled to the reaction mixture.

7. A process of claim 3 wherein the minimum quantity of p-xylene in said reaction mixture is about 1 mole percent based on the total of p-xylene and oxidation products thereof.

8. A process of claim 7 wherein the oxygen partial pressure is about from 4.5 to 30 psi, the amount of cobalt catalyst is at least about 0.1 percent by weight of the reaction mixture calculated as cobalt and the hold-up time is at least about 115 minutes.

9. A process of claim 8 wherein the weight ratio of acetic acid to the total of p-xylene and oxidation products thereof in the reaction mixture is about from 1:1 to 3:1.

10. A process of claim 9 wherein said reaction temperature is about from 115° to 140°C.

* * * * *